March 10, 1936.  D. MILLER  2,033,776
VEHICLE VENTILATING MECHANISM
Filed June 24, 1933  3 Sheets-Sheet 1

Fig. 1

Inventor
Dorr Miller
By Owen & Owen
Attorneys

March 10, 1936.  D. MILLER  2,033,776
VEHICLE VENTILATING MECHANISM
Filed June 24, 1933   3 Sheets-Sheet 2
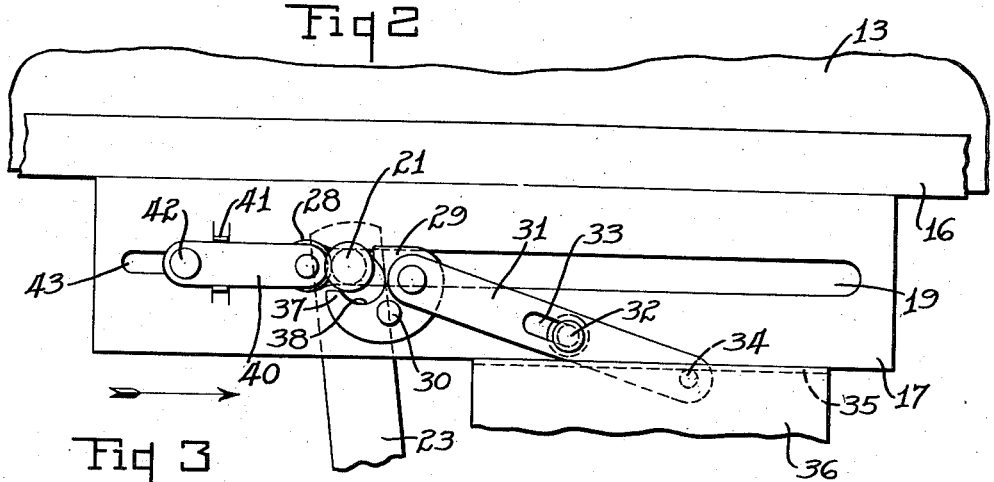
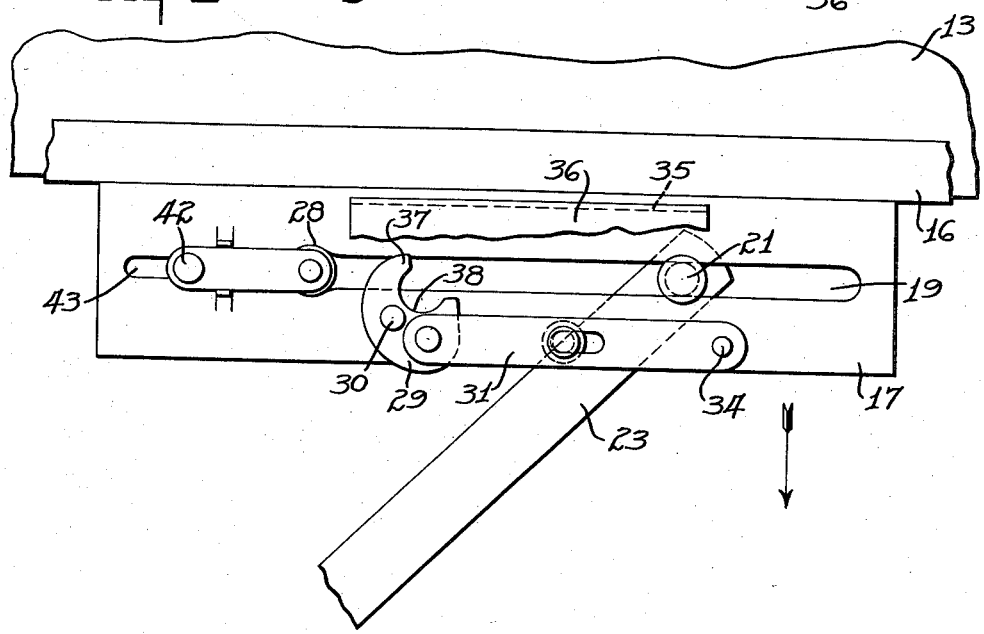
Inventor
Dorr Miller March 10, 1936.    D. MILLER    2,033,776
VEHICLE VENTILATING MECHANISM
Filed June 24, 1933    3 Sheets-Sheet 3
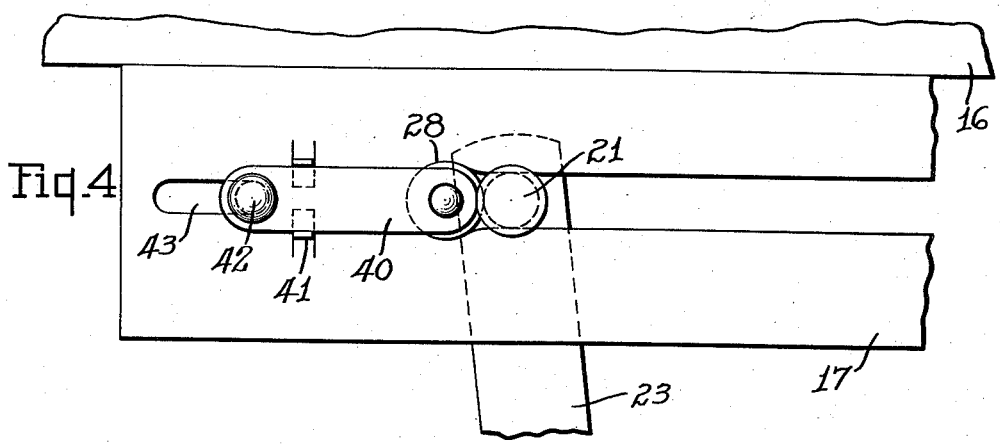
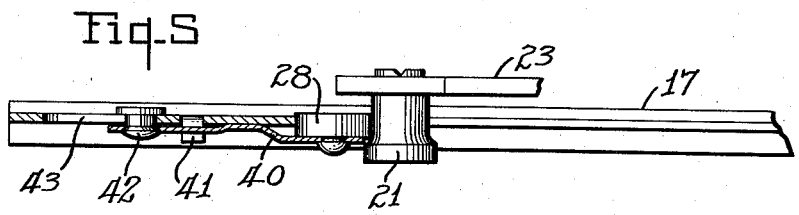
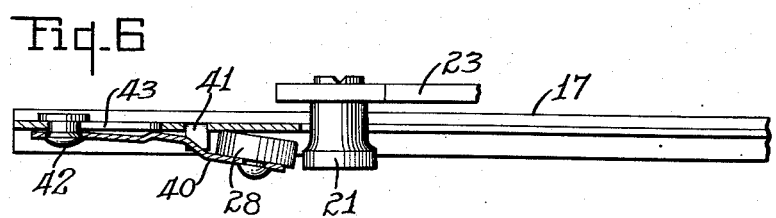

Patented Mar. 10, 1936

2,033,776

UNITED STATES PATENT OFFICE 2,033,776

VEHICLE VENTILATING MECHANISM

Dorr Miller, Detroit, Mich., assignor, by mesne assignments, to Automobile Ventilation, Inc., Detroit, Mich., a corporation of Michigan Application June 24, 1933, Serial No. 677,351

7 Claims. (Cl. 268—126)

This invention relates to vehicles, but more particularly to ventilating devices for automobiles, and is concerned with so-called "draftless ventilation" by which a ventilating opening is provided at the front of the window so that the rush of air created by the vehicle in motion forms a suction in the region of the opening to draw out foul air, gases, etc., from the inside of the car.

An important object of the invention is to produce a ventilating device for vehicles, which can be manufactured and installed at an exceedingly low cost, and is capable of bodily moving the window rearwardly when in raised position to provide the desired ventilating opening and positively return it to normal position.

Another object is to produce a window regulator mechanism which is adapted to raise and lower the window, and, when the window is in raised position, move the same rearwardly to provide an opening for ventilating purposes and positively move the window rearwardly to normal position.

"Draftless ventilation", so-called for automobiles, has proven exceedingly popular, and, is installed as standard equipment on many automobiles. For this purpose, many automobiles are equipped with divided window panels, the forward panel being swingable outwardly by manipulation of a regulator handle to provide the desired opening. The other panels are usually separately operated, and, although devices of this character operate satisfactorily, they are costly, and to some extent interfere with full vision.

A cardinal feature of this invention resides in producing a mechanism by which the window can be bodily moved rearwardly when in raised position to provide a ventilating opening between the front vertical edge of the window and the adjacent runway. Thereafter, by manipulation of the same regulator handle, the window can be moved forwardly to normal position, and, by further actuation of the regulator, the window may be lowered as desired. Thus, the same regulator functions not only to raise and lower the window, but also to move the same forwardly and rearwardly for ventilating purposes, and the entire mechanism lends itself to manufacture and installation at relatively low cost.

For purposes of illustration, an embodiment of the invention is shown on the accompanying drawings, in which:

Figure 1 is a vertical sectional elevation of an automobile door equipped with regulating mechanism in accordance with this invention;

Figure 2 is an enlarged view of a portion of the mechanism for imparting horizontal movement to the window showing the position that the parts assume during horizontal movement in a direction to close the ventilating opening;

Figure 3 is a view similar to Figure 2 but showing the position the parts assume during the downward or lowering movement of the window;

Figure 4 is a fragmentary view showing one of the regulator arms abutting the stop for moving the window panel rearwardly;

Figure 5 is a horizontal longitudinal sectional view of the parts shown in Figure 4; and Figure 6 is a view similar to Figure 5 showing the stop button pushed outwardly and moved laterally to enable the button on the regulator arm to move in the opening to permit the window to be detached from the regulator arm.

The illustrated embodiment of the invention comprises an automobile door 10 having a window opening 11, vertical runways 12 at opposite sides of the window opening, and a window panel 13. The rear edge of the window is provided with a well or recess 14 into which the window 13 may be moved. As will hereinafter appear, the window 13 may be moved or raised to its closed position, and, thereafter be moved rearwardly so that the rear edge portion is disposed in the well or recess 14, and thus provide an opening 15 between the vertical front edge of the window and the adjacent runway 12, the opening 15 being for ventilating purposes. In the forward movement of the vehicle, the rush of air on the outside of the car creates a suction in the region of the opening 15, thereby withdrawing foul air, gas, smoke, etc. from within the car.

Secured to the lower edge of the window 13 is a channel 16, which is suitably clamped in place so that the channel and window move together. Fixed to and depending from the underside of the channel 16 are rails 17 and 18 provided respectively with horizontally elongate guide channels 19 and 20. Disposed within the channels 19 and 20 are buttons or rollers 21 and 22 carried respectively on the outer ends of arms 23 and 24, which are fixed to and extend radially of gears 25 and 26. The gears 25 and 26 mesh with each other, and, a pinion 27, meshing with the gear 25, enables the mechanism to be manually operated, it being understood that the usual regulator handle is operatively connected to the pinion 27 in any suitable or well known manner.

It will be apparent that upon the conjoint operation of the gears 25 and 26, the arms 23 and 24 riding in the guide channels 19 and 20 impart raising or lowering movements to the window 13, as desired. When the window 13 is in raised position, upon further movement of the pinion 27 in the direction to raise the window the roller 21 moving to the left of the slot 19 (Fig. 2) abuts against a stop in the form of a disc 28, and against which it bears to impart rearward movement in a horizontal direction to the window 13, thus to provide a ventilating opening 15. It will be understood that the channel 16 and rails 17 and 18 move with the window 13, and, owing to the mounting of the window and the well or recess 14, lateral movement of the window is afforded.

It will be understood that as the arm 23 is moving to the left (Fig. 1), the arm 24 is moving in the opposite direction or to the right, the length of the slot 20 being sufficient for this purpose. It should be understood that horizontal movement is imparted to the window after the latter is moved substantially to its raised position, at which time the arms 23 and 24 have substantially arrived at the uppermost part in the arcs of their movement, although this action may be varied since after certain points in their areas, the vertical movement thereof is negligible.

When the stop arm 29 is in inoperative position the curved end portion 37 thereof is disposed uppermost or in the path of movement of the button 21, the arm 31 being in substantially horizontal position. When the arm 23 is moved to the left (Fig. 3) it will be understood that the button 21 engages the end 37 of the stop arm 29 and rocks the same about its pivot 30 to the position shown in Fig. 2, just prior to the button 21 coming into contact with the stop disc 28. The rocking movement of the stop arm 29 moves one end of the arm 31 upwardly and disposes the pin 34 in position to ride beneath the flange 35 so that upon horizontal or rearward movement of the window 13 the pin 34 is disposed in the desired position.

Return movement of the glass 13 forwardly or to its normal position where it can be lowered, is accomplished by reversing the direction of rotation of the pinion 27, whereupon the roller or button 21 abuts against an arcuately shaped stop arm 29, which is pivoted intermediate its ends on a pin 30 connected to the rail 17. Pivoted to the arm 29 adjacent one end thereof is an arm 31, which is pivoted between its ends on a pin 32 mounted on a rail 17, an elongate slot 33 in the arm 31 receiving the pin 32. Projecting laterally from the opposite end of the arm 31 is a pin 34, which is adapted to ride on the underside of a flange 35 formed on a plate 36 rigidly secured to the door 10.

It will be apparent that upon movement of the arm 23 in a clockwise direction or to the right of Figure 2, the button 21 acts against the arm 29 and tends to rock the arm 31 about its pivot 32 to bring the pin 34 in contact with the underside of the flange 35. Thus, by continued movement of the arm 23 to the right, movement is imparted to the window 13 in a horizontal direction returning the same to normal position. Upon reaching normal position the pin 34 will have passed the outer end of the flange 35, whereupon the pressure of the button 21 against the arm 29 will cause the latter to rock about its pivot 30 to assume a position substantially as that shown in Figure 3, in which the arm 29 is rocked out of the path of movement of the button 21. Upon continued movement of the arm 23 to the right the lowering of the window is accomplished in a manner well known to those skilled in this art.

It will thus be apparent that the stop arm 29 is automatically moved to operative position upon the upward swinging movement of the arm 23, and is properly positioned to receive the thrust of the button 21 when the arm is moved in the opposite direction to return the window 13 to normal position. It will be noted that between the ends of the stop arm 29 is an arcuate recess 38, which is shaped to receive the button 21 to enable the arm 29 to rock about the button 21 during movement from operative to inoperative position, or from inoperative to operative position, as will readily be apparent.

From the above description it is apparent that the same regulating mechanism operates not only to raise and lower the window, but when the window is in closed or raised position, further actuation of the same mechanism positively actuates the window rearwardly to afford a ventilating opening 15, and by actuating the mechanism in the direction to lower the window, the same is first moved positively forwardly to normal or closed position. It is thus apparent that at comparatively low cost the usual window regulating mechanism can be modified to operate in such manner as positively to obtain the desired ventilating opening, and the only change necessary in the door structure is to provide the well or recess 14 to receive the window upon the lateral movement thereof so that the mechanism is admirably adapted for commercial protection and installation without much additional expense.

To facilitate assembly and to enable the window to be removed, it will be noted that the inner end of the slot 20 is enlarged, as indicated at 39, so that when the button 22 registers with the enlarged opening 39, the rail 18 can be moved laterally to clear the button 22. To disengage the rail 17 from its regulator arm, it will be noted that the stop disc 28 is mounted on a spring 40 over which extend ears 41 on the rail 17, and which is secured to the rail by a pin 42 disposed in a horizontally elongate slot 43. By prying out the stop disc 28 and moving the same horizontally, as allowed by the pin and slot connection 42 and 43, the button 21 is enabled to move into the disc opening. It will be apparent that in this manner the rail 17 can be disengaged from the arm 23, the disc 28 closing an opening in the rail of sufficient size to enable the button 21 to pass therethrough.

By inserting a tool, such as screw driver, in the opening between the window and the frame, the stop disc 28 can be easily pried outwardly and moved laterally to accomplish this purpose. This operation may be effected as a practical matter by moving the stop disc 28 as above described, and then by actuating the regulator handle controlling the pinion 27, the arms 23 and 24 are moved toward each other to such position that the button 22 is disposed in the opening 39 and the button 21 is disposed in the opening previously occupied by the disc 28, and whereupon the window can be moved laterally and bodily removed.

One difficulty encountered in the design of this mechanism was to provide an efficient and satisfactory stop against which the regulator arm operates in moving the window panel forwardly from its rear position. This stop must be such as to operate automatically and be disposed in the desired position immediately at the time forward movement is desired. Furthermore, the stop must instantaneously be actuated to inoperative position at the time of lowering the window panel so as not to obstruct the free movement of the regulator arm. The above described mechanism fully meets the desideratum, and satisfactorily operates for fulfilling these requirements.

It is to be understood that numerous changes in details of construction, arrangement and operation may be effected without departing from the spirit of the invention, especially as defined in the appended claims.

What I claim as new and desire to secure by Letters Patent is:

1. In a regulating mechanism for a window having vertical and transverse movements, the combination of a guide member fixed to the lower edge of a window, a regulator having a swinging arm engaging said guide member for raising and lowering the window, a stop engageable by said arm when said guide member is in one of its extreme vertical positions, thereby to move said member and window horizontally in the plane of the window upon further swinging movement of said arm thereby to provide a ventilating opening, a second stop engageable by said arm when said guide member is in said position upon swinging movement thereof in the opposite direction for moving said guide member horizontally in the plane of the window to normal position, and a mounting for said first stop enabling same to be moved out of the way for disengaging said guide member from said arm.

2. In a regulating mechanism for a window having vertical and transverse movements, the combination of a guide member fixed to the lower edge of a window and having a horizontal channel, a regulator having a swinging arm engaging in said channel for raising and lowering the window, a stop engageable by said arm when the window is in raised position for moving the window horizontally in the plane of the window upon further swinging movement of said arm thereby to provide a ventilating opening through which air may be drawn from the vehicle, a mounting for said stop enabling same to be moved out of the way to enable the window and guide member to be bodily detached from said arm, a second stop engageable by said arm when the window is in raised position upon swinging movement of the arm in the opposite direction for moving the window horizontally in the plane of the window to normal position, a pivotal mounting for said stop, and means for swinging said stop out of the path of movement of said arm after said window has returned to normal position.

3. In a regulating mechanism for a window having vertical and transverse movements, the combination of a guide member fixed to the lower edge of the window and having a horizontal channel, a regulator having a swinging arm engaging in said channel for raising and lowering the window, a stop engageable by said regulator arm when the window is in raised position for moving the same rearwardly in the plane of the window to provide a ventilating opening, a second stop including a movable arm engageable by said regulator arm upon movement thereof in the opposite direction for returning the window to normal closed position, means movable with and forming a part of said second stop and engageable by said regulator arm when the window is moved rearwardly for disposing said stop arm in operative position, and means for moving said stop arm to inoperative position out of the path of movement of said regulator arm substantially upon return of the window to normal closed position.

4. In a regulating mechanism for a window having vertical and transverse movements, a member fixed to the lower edge of a window, a rail depending from said member having a longitudinally elongate guide channel adapted to receive an operating member, said channel having an enlarged opening at one end thereof, a stop member closing said opening, a spring plate connected at one end to said stop member, and means for mounting said plate on said rail enabling sliding movement thereof whereby said member can be pried outwardly and moved away from said opening thereby to enable the operating member to be detached from the rail.

5. In a vehicle body having a window opening, a glass panel mounted for sliding movement in said opening, a rail secured to the lower edge of said glass panel, and regulator mechanism for raising and lowering the glass panel and for shifting it longitudinally in its plane, including a swinging arm provided with a part adjacent one end thereof, a stop carried by said rail and engageable by the part on said swinging arm, said stop being adapted to be removed from the path of said part so as to permit assembly or disengagement of the arm from the rail.

6. Regulator mechanism for raising and lowering a window glass and also for shifting said glass longitudinally in its plane, including a swinging arm, a member carried by the glass to which said arm is detachably connected, a spring influenced stop carried by said member and engageable by said arm when moved in one direction for shifting the window glass longitudinally in its plane when in elevated position to provide or close a ventilating opening at one upright edge of the glass, and a second stop engageable by said arm when moved in the opposite direction for shifting the window longitudinally in the opposite direction.

7. Regulator mechanism for raising and lowering a window glass and also for shifting said glass longitudinally in its plane, including a swinging arm, a member carried by the glass to which said arm is detachably connected, a stop carried by said member and engageable by said arm when moved in one direction for shifting the window glass longitudinally in its plane when in elevated position to provide or close a ventilating opening at one upright edge of the glass, and a second stop engageable by said arm when moved in the opposite direction for shifting the window longitudinally in the opposite direction, said first named stop being adapted to be removed from the path of the swinging arm so as to permit assembly or disengagement of said arm from said member.

DORR MILLER.